Jan. 13, 1959   R. E. HEDGES   2,867,903
MEANS FOR HOLDING DENTURES IN PLACE
Filed July 29, 1957
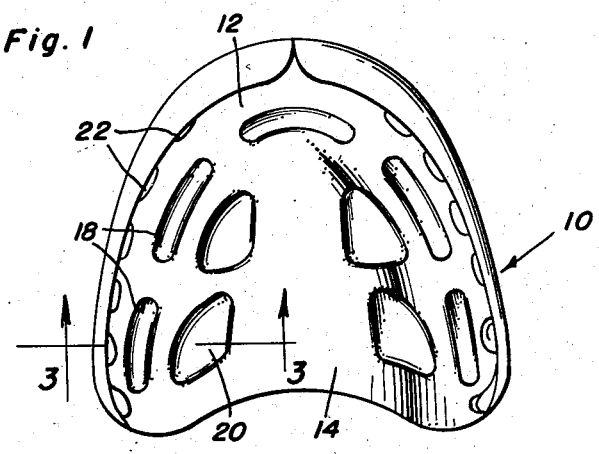
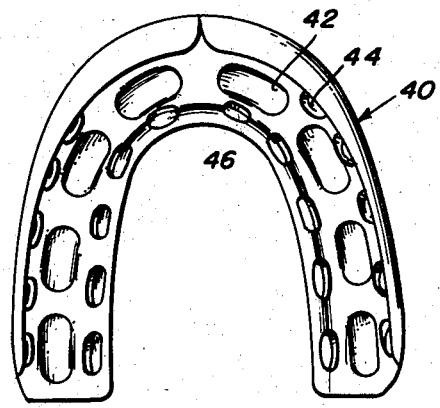
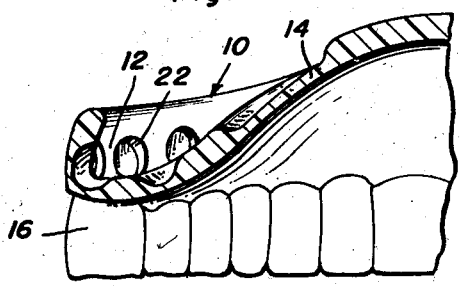
Roy E. Hedges
INVENTOR.
BY
Attorneys

United States Patent Office 2,867,903
Patented Jan. 13, 1959

2,867,903

MEANS FOR HOLDING DENTURES IN PLACE

Roy E. Hedges, Imperial, Nebr., assignor of fifty percent to Melvin L. Bonner, Imperial, Nebr.

Application July 29, 1957, Serial No. 674,916

1 Claim. (Cl. 32—3)

This invention relates to dental plates and more particularly to means for holding dentures in place.

The primary object of the present invention resides in the provision of a dental plate so constructed as to tenaciously and securely hold the denture in position in the mouth in an unexpectedly comfortable manner.

The concept of the present invention resides in the provision of recesses or depressions which are drilled in the dental plate after it has been constructed so as to closely conform to the contour of the mouth. In this manner, the denture is constructed to provide no projecting surface which will render the dental plate uncomfortable and which will be constructed as to closely fit the contours of the mouth before the recesses and depressions which provide suction means for holding the denture in place are drilled into the hard material of the dental plate thus assuring that the dental plate will continue to fit tightly after the recesses and depressions have been made in the plate.

Still further objects and features of this invention reside in the provision of means for holding dentures in place that is simple to employ, which results in greater comfort and improved ability in chewing and talking while functioning to hold the dental plate securely.

These, together with the various ancillary objects and features of the invention which will become apparent as the following description proceeds, are attained by this dental plate, preferred embodiments being shown in the accompanying drawings, by way of example only, wherein:

Figure 1 is a plan view of an upper denture;

Figure 2 is a plan view of a lower denture; and

Figure 3 is a sectional detail view as taken along the plane of line 3—3 of Figure 1.

With continuing reference to the accompanying drawings wherein like reference numerals designate similar parts throughout the various views, reference numeral 10 is used to generally designate an upper dental plate having a portion as at 12 conforming to the alveolar ridge for tight and secure engagement with the gum of the patient. Further, the dental plate 10 is provided with a portion 14 conforming mostly to the contours of the palate. Of course, artificial teeth as at 16 are mounted in the dental plate 10.

Unlike prior art devices which have materials performing suction means for holding the denture in place embedded therein or constructed during the manufacture of the dental plate, it is the concept of the present invention to closely fit the dental plate in the mouth of the patient and then form recesses as at 18 in the portion 12 together with depressions 20 in the palate 14.

Further the portion 12 may be provided with other recesses as at 22 providing suction means for holding the dental plate against the gum portions of the patient's mouth. The recesses 18, depressions 20 and recesses 22 may be of either regular or irregular shape. These recesses and depressions are formed in the plate by the dentist drilling the hard material from which the dental plates are constructed as he finds necessary. Unexpected comfort is achieved by the reduced contact surfaces and the suction pockets formed, it being noted that there are no raised portions which might be otherwise difficult to determine the location thereof because of the depressions and recesses because the dental plate has already been fitted in the patient's mouth and showed no high spots even before the recesses and depressions have been formed in the dental plate. In addition, dental plates which are in use without the recesses or depressions, may be easily converted to the present invention by dentist drilling the recesses and depressions therein.

In Figure 2 there is shown a lower dental plate 40 having a plurality of rows of recesses 42, 44 and 46 therein which may be of different sizes and offset from each other and formed in the alveolar portion of the dental plate. It is noted that these recesses and depressions may be of regular or irregular shape and are preferably offset from each other so as to provide numerous points of contact of the dental plate with the mouth of the patient while providing no straight line of non-contact. This is of course similar to the offset arrangement of the depressions 20 from the recesses 18 and the recesses 22 from the recesses 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a denture plate having a channel portion corresponding in shape longitudinally to the alveolar ridge of a mouth and a distal ridge bounding said channel portion, a plurality of elongated recesses in the bottom of said channel portion extending in end-to-end spaced apart relation in said channel portion longitudinally thereof, and a plurality of recesses in said ridge facing said channel portion and spaced apart longitudinally of said channel portion in staggered relation to the first named recesses, said recesses forming closely spaced separate suction cups for retaining the plate in place against the alveolar ridge of a mouth.

References Cited in the file of this patent

UNITED STATES PATENTS 912,026    Powers _____ Feb. 9, 1909